(12) United States Patent
Huang et al.

(10) Patent No.: US 12,158,624 B2
(45) Date of Patent: Dec. 3, 2024

(54) MULTI-LAYER WAVEGUIDE OPTICAL COUPLER

(71) Applicant: Taiwan Semiconductor Manufacturing Company, LTD., Hsinchu (TW)

(72) Inventors: Tai-Chun Huang, New Taipei (TW); Stefan Rusu, Sunnyvale, CA (US)

(73) Assignee: TAIWAN SEMICONDUCTOR MANUFACTURING COMPANY, LTD., Hsinchu (TW)

(*) Notice: Subject to any disclaimer, the term of this patent is extended or adjusted under 35 U.S.C. 154(b) by 192 days.

(21) Appl. No.: 17/832,795

(22) Filed: Jun. 6, 2022

(65) Prior Publication Data

US 2023/0393352 A1    Dec. 7, 2023

(51) Int. Cl.
*G02B 6/42*    (2006.01)
*G02B 6/122*   (2006.01)

(52) U.S. Cl.
CPC .......... *G02B 6/4206* (2013.01); *G02B 6/122* (2013.01); *G02B 6/1228* (2013.01)

(58) Field of Classification Search
CPC .... G02B 6/1228; G02B 6/12002; G02B 6/14; G02B 6/268; G02B 6/305
See application file for complete search history.

(56) References Cited

U.S. PATENT DOCUMENTS 7,329,050 B1    2/2008   Dugan et al.
9,703,047 B2 *  7/2017   Painchaud ............ G02B 6/124

2003/0235227 A1 * 12/2003 Chand .................. G02B 6/1228
372/50.1

(Continued)

FOREIGN PATENT DOCUMENTS

JP    2004177730 A    6/2004
TW     201830071 A    8/2018

(Continued)

OTHER PUBLICATIONS

A.C. Madayag and Z. Zhou, Optimization of spin-on-glass process for multilevel metal interconnects, 2001, IEEE, accessed URL: <https://ieeexplore.ieee.org/document/960315/authors#authors> on Feb. 8, 2024 (Year: 2001).*

(Continued)

*Primary Examiner* — Michelle R Connelly
*Assistant Examiner* — Kirsten D. Endresen
(74) *Attorney, Agent, or Firm* — Lippes Mathias LLP

(57) ABSTRACT

An optical coupler includes: a plurality of waveguide core layers that are (i) stacked vertically one over another, (ii) spaced apart vertically one from another and (iii) extending from a light receiving end of the optical coupler longitudinally through the optical coupler to a light output end of the optical coupler, wherein each of the plurality of waveguide core layers includes a plurality of distinct waveguide paths extending from the light receiving end of the optical coupler along a length of the optical coupler; and a cladding formed from a cladding material cladding material surrounding each of the plurality of waveguide core layers. Light propagating within outer ones of the plurality of waveguide core layers is directed toward an interior one of the plurality of waveguide core layers via evanescent coupling between adjacent ones of the plurality of waveguide core layers.

20 Claims, 10 Drawing Sheets

(56) References Cited

U.S. PATENT DOCUMENTS

| | | | | |
|---|---|---|---|---|
| 2004/0264868 A1* | 12/2004 | Block | ................ | G02B 6/12002 |
| | | | | 385/50 |
| 2015/0234137 A1* | 8/2015 | Kuo | .................... | G02B 6/4214 |
| | | | | 385/14 |
| 2021/0026074 A1* | 1/2021 | Horth | ................... | G02B 6/1228 |
| 2023/0393333 A1* | 12/2023 | Huang | ............... | G02B 6/12002 |

FOREIGN PATENT DOCUMENTS

| | | |
|---|---|---|
| TW | I1705275 B | 9/2020 |
| TW | 202219567 A | 5/2022 |

OTHER PUBLICATIONS

Desert Silicon, Spin-on glass FAQ, accessed URL: <https://desertsilicon.com/faq/#:~:text=What%20is%20the%20refractive%20index,indexes%20of%201.42%20to%202.5.> on Feb. 8, 2024 (Year: 2024).*

* cited by examiner

MULTI-LAYER WAVEGUIDE OPTICAL COUPLER

BACKGROUND

The following relates to the semiconductor arts, and in particular, to a method and/or apparatus for effective optical coupling of light output from a light source, for example, such as a laser diode.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features as shown in the accompany figures may be arbitrarily increased or reduced for clarity of discussion.

DETAILED DESCRIPTION

Figure 1:
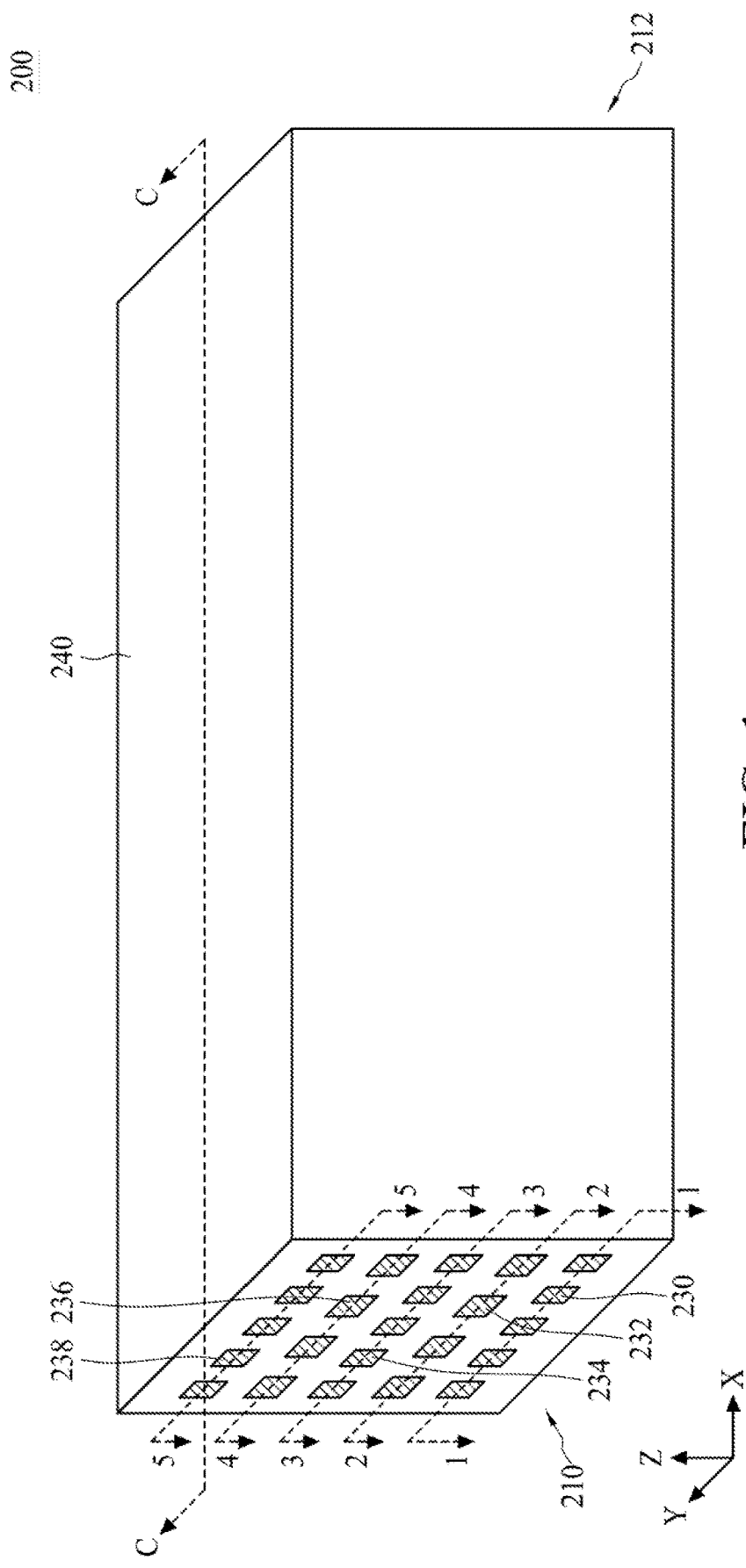
FIG. 1 diagrammatically illustrates a perspective view of an optical coupler in accordance with some embodiments disclosed herein.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "left," "right," "side," "back," "rear," "behind," "front," "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

In general, there is disclosed herein an optical coupler, for example, suitable for photonic platforms, which includes a three-dimensional (3D) multi-layer silicon waveguide. In some suitable embodiments, the 3D multi-layer waveguide may be included in and/or as part of a silicon photonic platform, for example, such as a photonic integrated circuit (PIC) or an integrated optical circuit, which may also include an integrated laser chip or die or other source of light which is input to the optical coupler. One advantage of the disclosed 3D multi-layer waveguide design is improved vertical and/or horizontal alignment tolerance and/or easing of alignment and/or manufacturing process constraints between a light source and the optical coupler, while retaining a high optical coupling efficiency and/or low power loss therebetween.

In some suitable embodiments, a silicon nitride ($Si_3N_4$), silicon and/or another like material may be employed as the waveguide core(s), i.e., the material in which the light is propagated. One advantage of using silicon nitride is that it is relatively highly thermodynamically stable, and hence, may help avoid unwanted influence and/or undesirable effects associated with temperature fluctuations or the like. In some suitable embodiments, a cladding surrounding the waveguide core material may be formed from and/or of a silicon dioxide ($SiO_2$) and/or another suitable oxide or cladding material. Suitably, the waveguide cladding material has a relatively lower index of refraction as compared to an index of refraction of the waveguide core material.

In some embodiments, a high-calibrated tolerance multi-layer laser optical waveguide coupler is based on a silicon insulator platform. One advantage of some embodiments is that the optical coupler can be widely used for direct coupling of laser beams. The use of a multi-layer symmetric structure in the optical coupler can significantly reduce the manufacturing process constraints and/or improve the calibration tolerance, for example, in the vertical and/or horizontal directions, while effectively converging or funneling the light energy into one of the waveguide cores of the optical coupler for wave propagation.

In some embodiments, there may be a certain cavity, gap or distance between an output end of the light source and an input end of the optical 3D multi-layer waveguide coupler, for example, as a result of the manufacturing process employed. In practice, this cavity or gap may be, for example, in a range of between about 0 micrometers (μm) wide and about 2 μm wide, inclusive. In some suitable embodiments, this cavity or gap may suitably be filled with a material, for example, such as a high dielectric constant (high-k) material, sol-gel and/or other like material. For example, the cavity or gap filling material may have an index of refraction in a range of between about 1.1 and about 3.9, inclusive. In some suitable embodiments, the cavity or gap filling material is selected or chosen to effectively match or transition to the index of refraction of the waveguide core material. Advantageously, the index matching cavity/gap filling material may be chosen and/or act to limit the optical mode, for example, so that the laser light field produced by the light source and the receiving end of the optical coupler are modal matched, thereby reducing loss and/or improving coupling efficiency. That is to say, advantageously, the cavity/gap filling material may help to inhibit the gap from behaving as a resonance cavity and/or reduce internal reflections at the interface with the light receiving end of the optical coupler.

For ease of reference and illustrative purposes herein, the FIGURES and the various elements and/or components depicted therein are shown relative to an otherwise arbitrarily chosen 3D cartesian coordinate system including X, Y and Z axes as shown in the FIGURES. While consistency is maintained among and/or across the various FIGURES, it is to be appreciated the directions and/or orientations indicated by these axes are chosen primarily for the purpose of facilitating the description provided herein, for example, to describe and/or identify relative orientations and/or directions. Unless otherwise indicated, the illustrated coordinate system, in and of itself, is not intended to be limiting and should not be read or interpreted as such.

FIG. 1 shows a three-dimensional (3D) multi-layer waveguide optical coupler 200 according to some suitable embodiments disclosed herein. As shown, the optical coupler 200 includes a first light receiving or input end 210 and a second light output end 212, opposite the first end 210. As shown, the optical coupler 200 includes a plurality of waveguide core layers 230, 232, 234, 236 and 238 arranged vertically (for example, in a direction of the Z axis) one over the other and extending longitudinally (for example in a direction of the X axis) within the optical coupler 200, which core layers 230, 232, 234, 236 and 238 are encased in and/or surrounded by a cladding 240.

Figure 2:
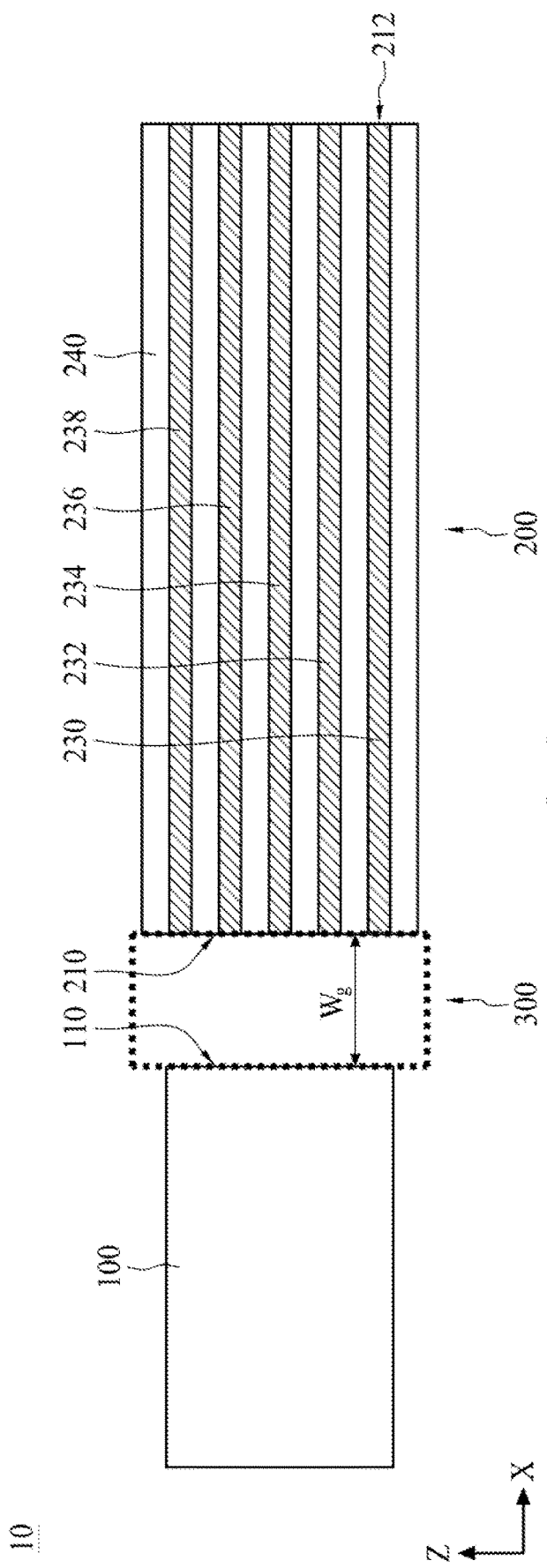
FIG. 2 diagrammatically illustrates an embodiment of a photonic apparatus including a side cross-section view (taken along section line C-C) of the optical coupler shown in FIG. 1.

With reference now to FIG. 2, there is shown a photonic apparatus 10 including a light source 100 and the optical coupler 200 according to some suitable embodiments disclosed herein. In some suitable embodiments, the photonic apparatus 10 may be a PIC or an integrated optical circuit. Accordingly, the light source 100 and the optical coupler 200, in some suitable embodiments, may be built-up and/or otherwise formed on a common silicon wafer or other suitable substrate (not shown) using any one or more of a variety of semiconductor manufacturing process steps, including but not limited to front end of line (FEOL), middle end of line (MEOL) and back end of line (BEOL) semiconductor manufacturing processes. For example, any one or more of various semiconductor manufacturing process steps may be carried out to form and/or otherwise create the light source 100 and/or the optical coupler 200, including, but not limited to: wafer cleaning and/or other substrate preparation steps; material deposition steps to build-up and/or create a variety of thin films and/or layers of material, for example, using chemical vapor deposition (CVD), plasma-enhanced CVD (PECVD), atomic layer deposition (ALD), physical layer deposition (PLD), sputtering, epitaxial growth, molecular-beam epitaxy (MBE), and/or other thin film or layer depositing and/or growing steps; material forming and/or patterning steps, like photolithography, including photoresist application, exposure, developing and etching (for example, such as dry or plasma etching and/or wet etching); other material removal and/or planarization steps such as chemical mechanical polishing (CMP) or the like; n-type or p-type or other doping, ion implantation, annealing, oxidation and/or other material modification steps; via formation and/or metallization steps; wafer back-grinding and/or polishing; die preparation and/or wafer dicing steps; encapsulation steps; wafer and/or die testing or other metrology; etc.

In some suitable embodiments, the light source 100 may be a laser diode, optic fiber, semiconductor optical amplifier (SOA) or the like that emits laser light or the like from a light emitting end 110 thereof, for example, generally in a direction of the X axis. In some suitable embodiments, the emitted light may be in the infrared (IF), or more specifically the near-IR, region of the electromagnetic spectrum. In some embodiments, the emitted light may have a wavelength or wavelengths in a range of between about 1260 nanometers (nm) and about 1360 nm, inclusive.

Figure 3:
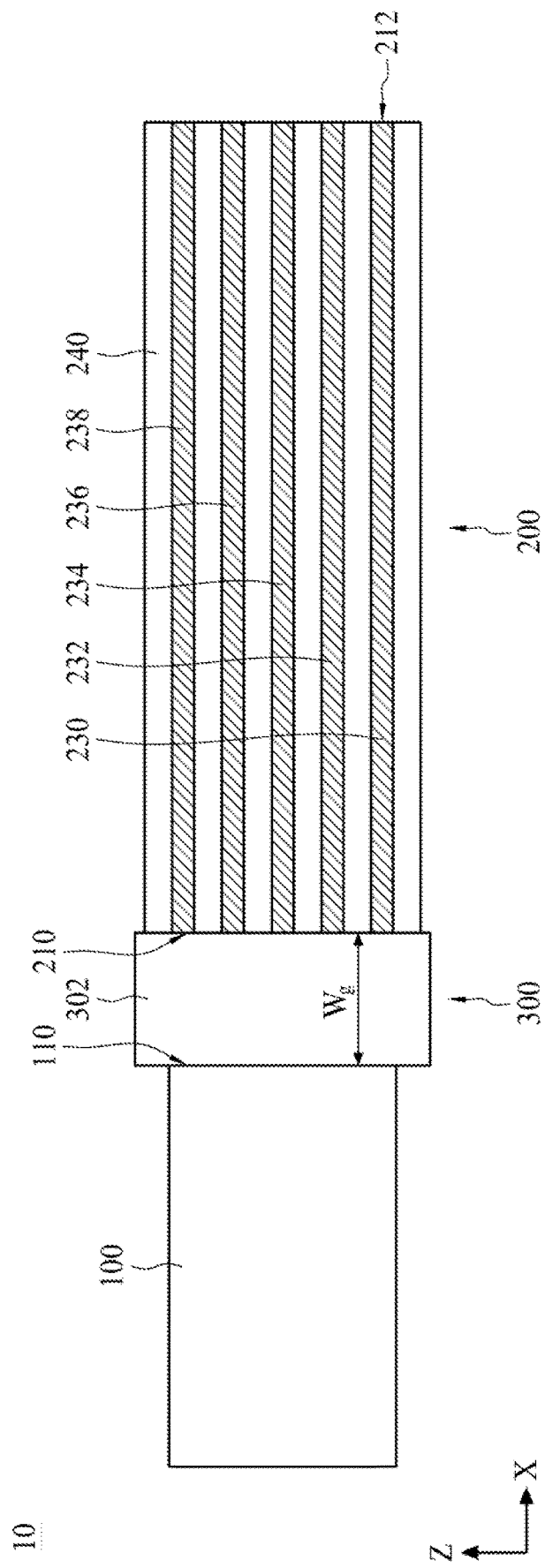
FIG. 3 diagrammatically illustrates another embodiment of a photonic apparatus including a side cross-section view (taken along section line C-C) of the optical coupler shown in FIG. 1.

As shown in FIG. 2, the light emitting end 110 of the light source 100 faces the light receiving end 210 of the optical coupler 200. In some suitable embodiments, the light emitting end 110 of the light source 100 is spaced apart from the light receiving end 210 of the optical coupler 200, for example, forming a cavity or gap 300 therebetween. In practice, a width $w_g$ (for example, measured in a direction of the X axis) of the gap 300 may be, for example, in a range of between about 0 μm and about 2 μm, inclusive. In some suitable embodiments, as shown in FIG. 3 for example, the cavity or gap 300 may be filled with a suitable filler material 302. Suitably, the cavity or gap filling material 302 may be a high-k material, sol-gel or the like. In practice, the fill material 302 suitably acts as a refractive index matching material helping to reduce or limit internal reflections of light propagating within the fill material 302, for example, at the interface between the fill material 302 and the light receiving end 210 of the optical coupler 200, thereby encouraging or otherwise promoting transmission of the light into the optical coupler 200 at this interface. In some suitable embodiments, the cavity or gap filling material 302 may have an index of refraction in a range of between about 1.1 and about 3.9, inclusive. In some other alternative embodiments, the cavity or gap 300 may remain unfilled or otherwise be simply filled with air, i.e., the cavity/gap 300 may essentially comprise an air gap, as shown in FIG. 2 for example.

Figure 4:
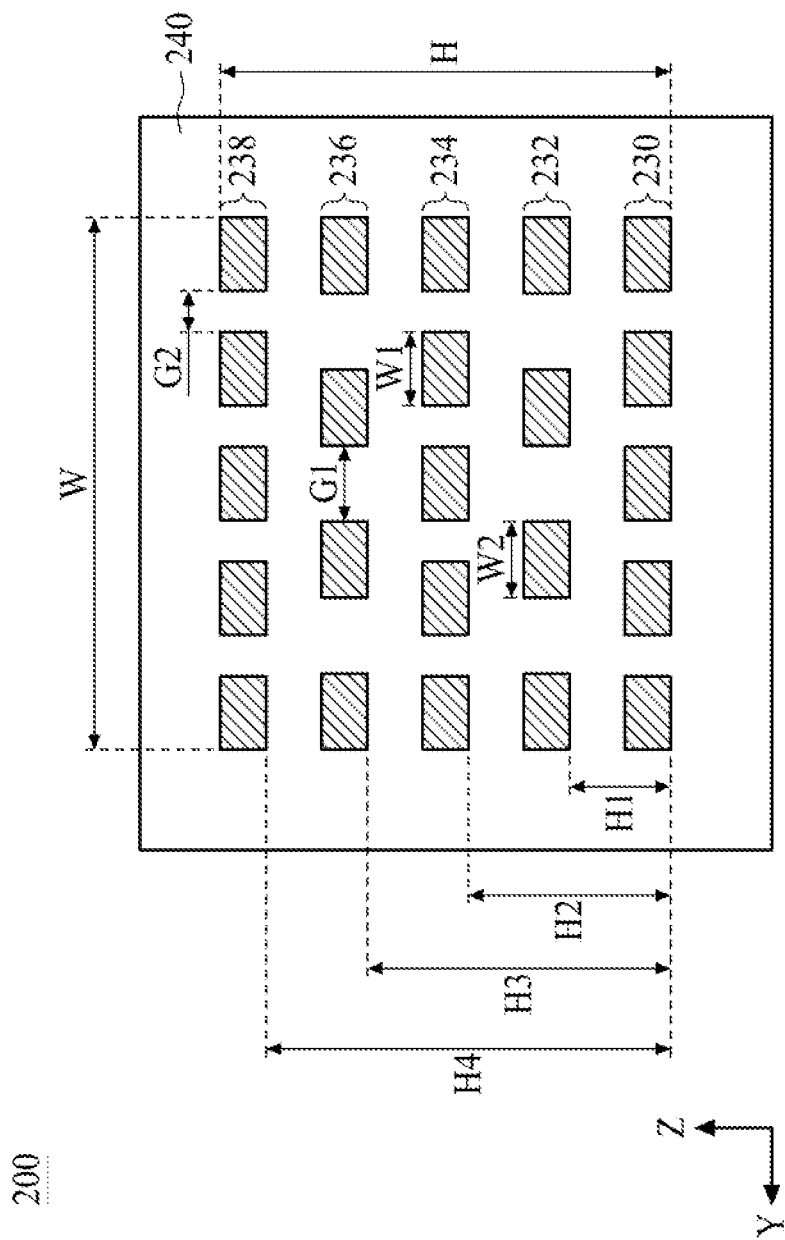
FIG. 4 diagrammatically illustrates a plan view of a light receiving and/or input end of the optical coupler shown in FIG. 1.

As shown in FIGS. 2-4 for example, the 3D multi-layer optical coupler 200 includes a plurality of waveguide core layers, including: a first waveguide core layer 230, a second waveguide core layer 232, a third waveguide core layer 234, a fourth waveguide core layer 236 and a fifth waveguide core layer 238. More generally, the first, second, fourth and fifth waveguide core layers 230, 232, 236 and 238 may be referred to herein from time to time as the outer waveguide core layers, while the third waveguide core layer 234 may be referred to herein from time to time as the central or middle waveguide core layer; the first and fifth waveguide core layers 230 and 238 may be referred to herein from time to time as the outermost waveguide core layers; and the second and fourth waveguide core layers 232 and 236 may be referred to herein from time to time as the intermediate waveguide core layers.

Suitably, each waveguide core layer 230, 232, 234, 236 and 238 has a first end at or near the light receiving end 210 of the optical coupler 200 and extends longitudinally (for example, in a direction of the X axis) through the optical coupler 200 therefrom. In practice, the first ends of each waveguide core layer 230, 232, 234, 236 and 238 face the light emitting end 110 of the light source 100 and/or are exposed to light emitted from the light source 100. In some suitable embodiments, the waveguide core layers 230, 232, 234, 236 and 238 extend all the way or substantially all the way to the light output end 212 of the optical coupler 200, opposite the light receiving or input end 210 of the optical coupler 200.

In some suitable embodiments, the waveguide core layers 230, 232, 234, 236 and 238 may be formed from and/or of a suitable waveguide core material, for example, such as a silicon nitride ($Si_3N_4$), silicon and/or another dielectric or other like material suitable for the propagation of light therein, at least for light having wavelengths at or near the operating wavelength of the light source 100, i.e., at or about the wavelength of the light emitted from the light source 100. In some suitable embodiments, each of the waveguide core layers 230, 232, 234, 236 and 238 is formed from and/or of the same waveguide core material. In other suitable embodiments, one or more of the various waveguide core layers 230, 232, 234, 236 and 238 may be formed from and/or of waveguide core material different from one or more of the others. Suitably, a thickness, for example, measured in a direction of the Z axis, of each of the waveguide core layers 230, 232, 234, 236 and 238 may be in a range of between about 15 nm and about 1000 nm, inclusive. In some embodiments, each of the waveguide core layers 230, 232, 234, 236 and 238 may have the same thickness, while in other embodiments, one or more of the various waveguide core layers 230, 232, 234, 236 and 238 may have a thickness different from one or more of the others.

In some suitable embodiments, the waveguide core layers 230, 232, 234, 236, and 238 are surrounded by and/or encased in a cladding 240. Suitably, the cladding 240 may be formed from and/or of a silicon dioxide ($SiO_2$) and/or another suitable oxide or cladding material. In practice, the waveguide cladding material has an index of refraction $n_1$ which is less than an index of refraction $n_2$ of the waveguide core material, at least for light having wavelengths at or near the operating wavelength of the light source 100, i.e., at or about the wavelength of the light emitted from the light source 100. Accordingly, light from the light source 100 which is launched into or otherwise enters the waveguide core layers 230, 232, 234, 236 and 238, for example, from the light receiving end 210 of the optical coupler 200, may be largely contained to propagate (for example, generally in the direction of the X axis) within the waveguide core layers 230, 232, 234, 236 and 238, for example, by total internal reflection (TIR) and/or frustrated TIR (FTIR).

Figure 5:
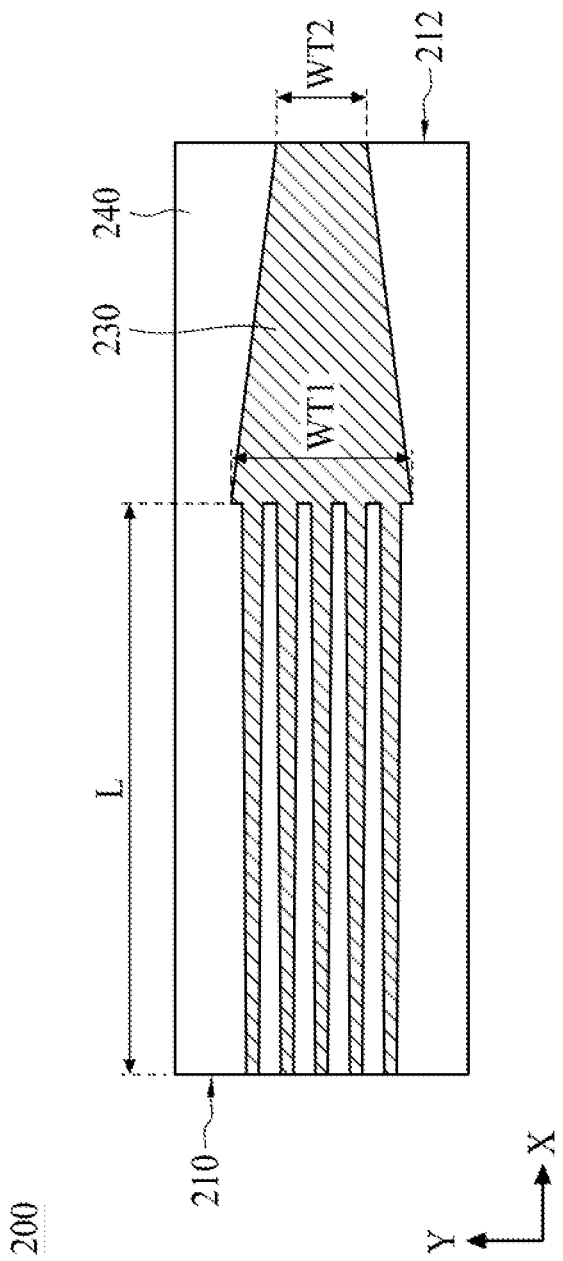
FIG. 5 diagrammatically illustrates a top cross-section view (taken along section line 1-1) of the optical coupler shown in FIG. 1.
Figure 9:
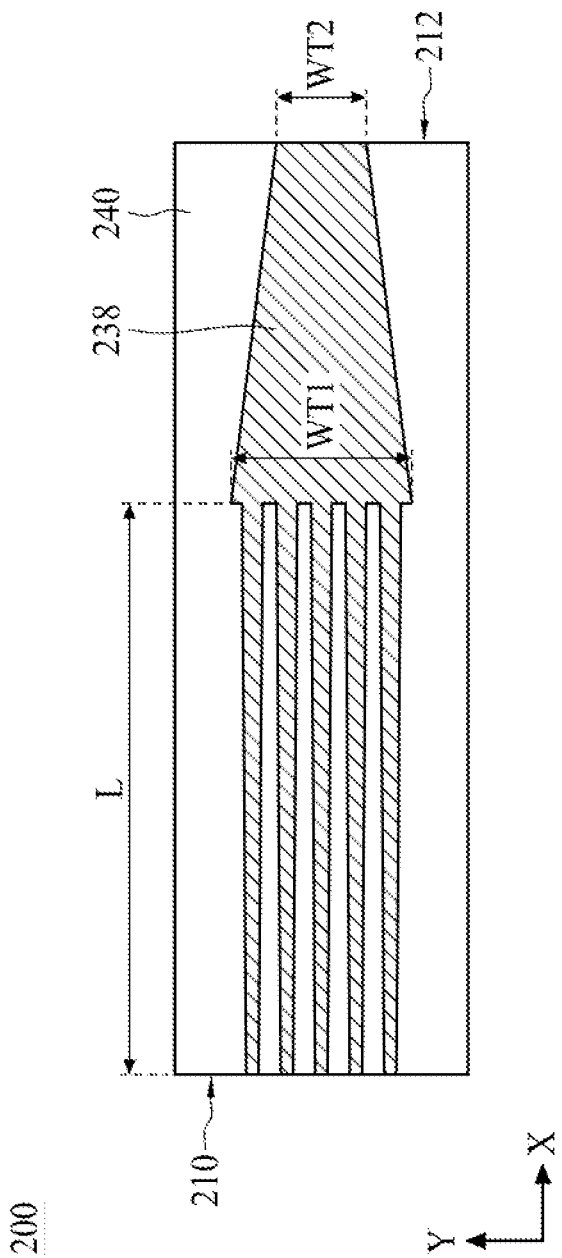
FIG. 9 diagrammatically illustrates a top cross-section view (taken along section line 5-5) of the optical coupler shown in FIG. 1.

As shown in FIGS. 5 and 9 for example, the outermost waveguide core layers 230 and 238 may include a linearly or otherwise tapered region proximate the light output end 212 of the optical coupler 200, for example, to change, control or regulate the size and/or shape of light propagating therethrough, for example, generally in a direction of the X axis. That is to say, the taper may function to change the size and/or shape of the optical mode carried in the outermost waveguide core layers 230 and 238. In some suitable embodiments, the taper is sufficiently gradual and/or otherwise formed such that it operates adiabatically and/or with limited transmission losses, for example, in the Y axis direction. As shown in FIGS. 5 and 9, the outermost waveguide core layers 230 and 238 taper from a first width WT1 (for example, measured in a direction of the Y axis) proximate to the light receiving end 210 of the optical coupler 200 to a second width WT2 (for example, measured in a direction of the Y axis) at and/or proximate to the light output end 212 of the optical coupler 200, where the second width WT2 is less than the first width WT1. In some suitable embodiments, the first width WT1 may be in a range of between about 5 μm and about 3 μm inclusive. In some suitable embodiments, the second width WT2 may be in a range of between about 4 μm and about 1 μm inclusive. In some suitable embodiments, the width WT2 is in a range of between about 90% and about 10%, inclusive of the width WT1.

Figure 6:
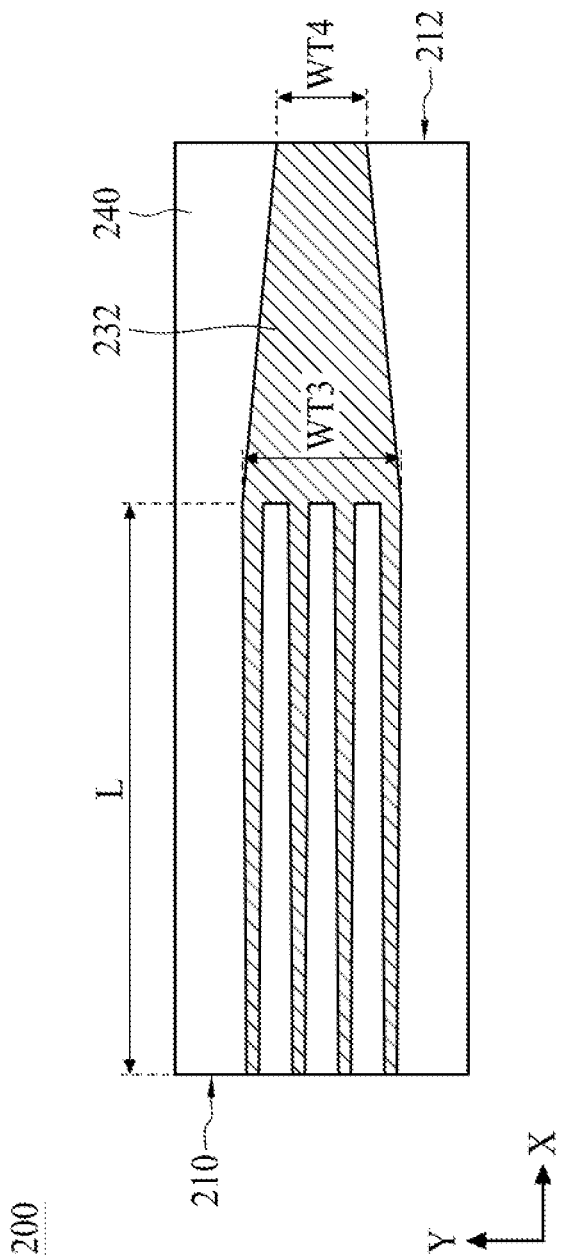
FIG. 6 diagrammatically illustrates a top cross-section view (taken along section line 2-2) of the optical coupler shown in FIG. 1.
Figure 8:
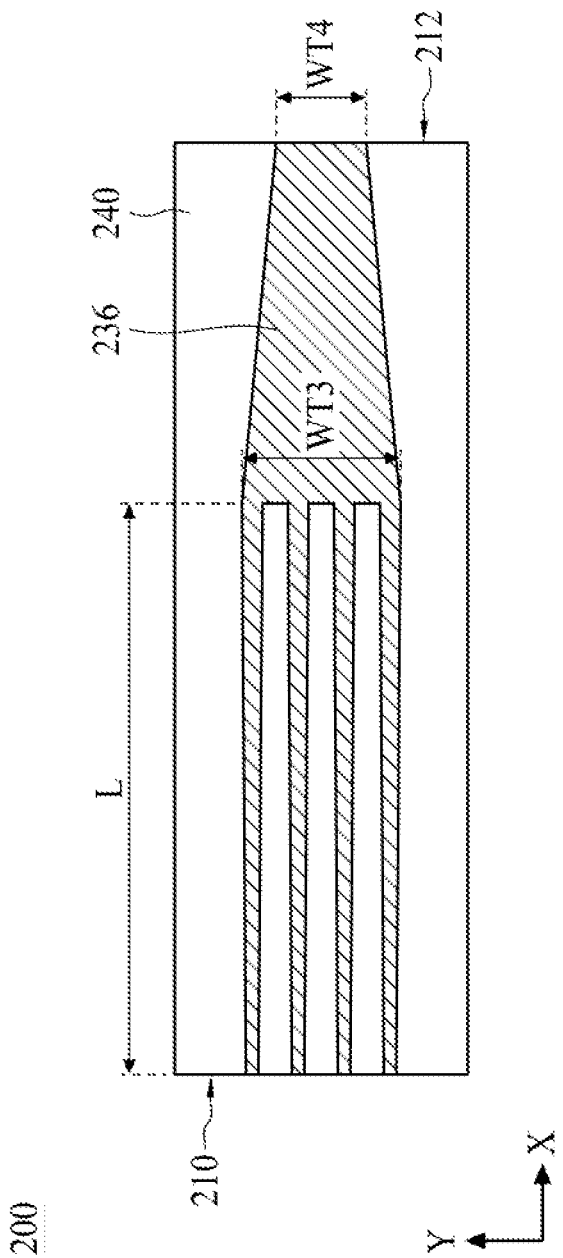
FIG. 8 diagrammatically illustrates a top cross-section view (taken along section line 4-4) of the optical coupler shown in FIG. 1.

As shown in FIGS. 6 and 8 for example, the intermediate waveguide core layers 232 and 236 may also include a linearly or otherwise tapered region proximate the light output end 212 of the optical coupler 200, for example, to change, control or regulate the size and/or shape of light propagating therethrough, for example, generally in a direction of the X axis. That is to say, the taper may function to change the size and/or shape of the optical mode carried in the intermediate waveguide core layers 232 and 236. In some suitable embodiments, the taper is sufficiently gradual and/or otherwise formed such that it operates adiabatically and/or with limited transmission losses, for example, in the Y axis direction. As shown in FIGS. 6 and 8, the intermediate waveguide core layers 232 and 236 taper from a first width WT3 (for example, measured in a direction of the Y axis) proximate to the light receiving end 210 of the optical coupler 200 to a second width WT4 (for example, measured in a direction of the Y axis) at and/or proximate to the light output end 212 of the optical coupler 200, where the second width WT4 is less than the first width WT3. In some suitable embodiments, the width WT1 in the outmost waveguide core layers 230 and 238 is greater than the width WT3 in the intermediate waveguide core layers 232 and 236 and may be in a range of between about 10% and about 20%, inclusive, larger than the width WT3. In some suitable embodiments, the width WT2 in the outermost waveguide core layers 230 and 238 is less than the width WT4 in the intermediate waveguide core layers 232 and 236 and may be in a range of between about 10% and about 20%, inclusive, smaller than the width WT4.

Figure 7:
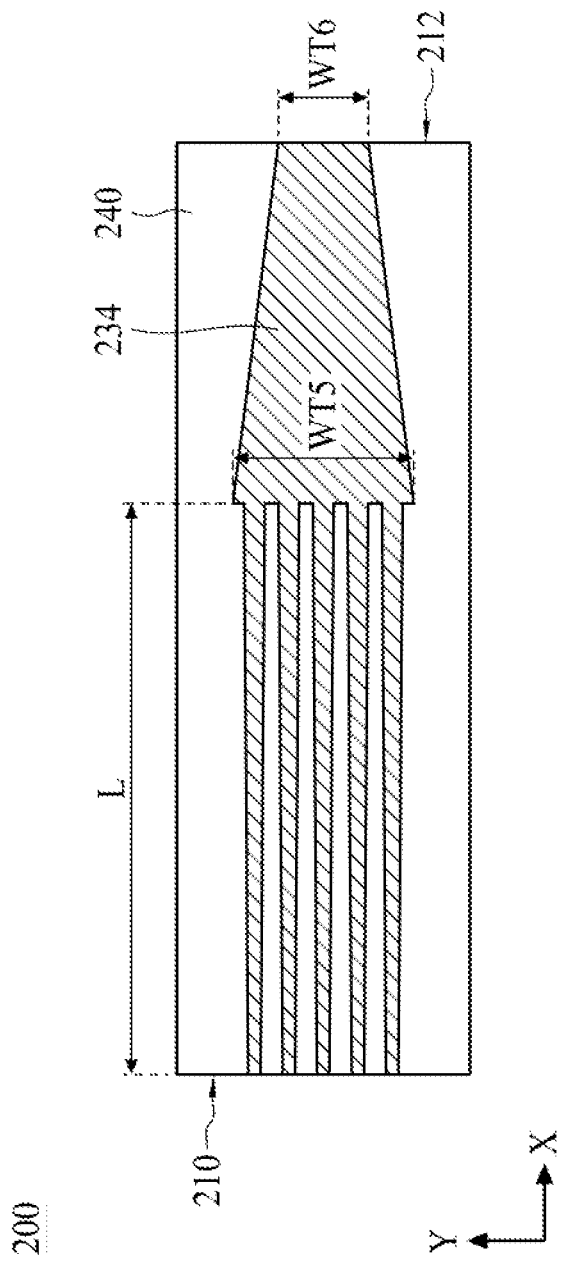
FIG. 7 diagrammatically illustrates a top cross-section view (taken along section line 3-3) of the optical coupler shown in FIG. 1.

As shown in FIG. 7 for example, the central or middle waveguide core layer 234 may also include a linearly or otherwise tapered region proximate the light output end 212 of the optical coupler 200, for example, to change, control or regulate the size and/or shape of light propagating therethrough, for example, generally in a direction of the X axis. Again, that is to say, the taper may function to change the size and/or shape of the optical mode carried in the central or middle waveguide core layer 234. In some suitable embodiments, this taper is also sufficiently gradual and/or otherwise formed such that it operates adiabatically and/or with limited transmission losses, for example, in the Y axis direction. As shown in FIG. 7, the central or middle waveguide core layer 234 tapers from a first width WT5 (for example, measured in a direction of the Y axis) proximate to the light receiving end 210 of the optical coupler 200 to a second width WT6 (for example, measured in a direction of the Y axis) at and/or proximate to the light output end 212 of the optical coupler 200.

As shown in FIGS. 5-9, each of the waveguide core layers 230, 232, 234, 236 and 238 includes a region proximate to the light receiving end 210 of the optical coupler 200 having a plurality of distinct waveguide paths extending from the light receiving end 210 of the optical coupler 200 along a length L and into the respective tapered regions of the waveguide core layers 230, 232, 234, 236 and 238. For example, as shown, these distinct waveguide paths may be separated from one another by the cladding 240. In some suitable embodiments, the length L may be in a range of between about 70 μm and about 100 μm, inclusive. In some suitable embodiments, the outermost waveguide core layers 230 and 238 and the central or middle waveguide core layer 234 may five such distinct waveguide paths as shown or another odd number of such distinct waveguide paths, while the intermediate waveguide core layers 232 and 236 may have four such distinct waveguide paths as shown or another even number of such distinct waveguide paths.

With particular attention now to FIG. 4, the first, second, third, fourth and fifth waveguide core layers 230, 232, 234, 236 and 238 are arranged one above and/or over another and vertically (for example, in a direction of the Z axis) spaced apart from one another, as shown, by the cladding 240. In some suitable embodiments, along with the profile, dimensions, shape and/or geometry of the various waveguide core layers 230, 232, 234, 236 and 238, the spacings between the first, second, third, fourth and fifth waveguide core layers 230, 232, 234, 236 and 238 are selected and/or arranged to permit, aid, encourage and/or promote evanescent and/or near-field coupling and/or transmission of light from the outer waveguide core layers (i.e., waveguide core layers 230, 232, 236 and 238) to and/or toward the central or middle waveguide core layer (i.e., waveguide cord layer 234). That is to say, light propagating in the outmost waveguide core layers 230 and 238 is transmitted to the intermediate waveguide core layers 232 and 236, respectively, for example, by way of evanescent and/or near-field coupling therebetween or the like; and, light propagating in the intermediate waveguide core layers 232 and 236 is transmitted to the central or middle waveguide core layer 234, for example, by way of evanescent and/or near-field coupling therebetween or the like. Thus, as seen in the end view of FIG. 4, each waveguide path is a waveguide core portion, and the plurality of distinct waveguide paths form an light input aperture comprising a staggered two-dimensional (2D) array of waveguide cores, with each distinct waveguide path of the staggered array being separated from the other distinct waveguide paths of the staggered 2D array by cladding material fully surrounding (i.e., encircling, i.e. on all four sides in the Y-Z plane) the distinct waveguide path. The 2D array is a staggered array due to the arrangement of layers of five distinct waveguide paths (or, more generally, odd number) along the Y-direction alternating with layers of four distinct waveguide paths (or more generally, even number) along the Y-direction.

In practice, the light emitted from the light source 100 may enter one or more of the distinct waveguide paths of one or more of the waveguide core layers 230, 232, 234, 236 and/or 238 at the exposed ends proximate the light receiving or input end 210 of the optical coupler 200, for example, due to the vertical and/or horizontal divergence (for example, in the Z and/or Y axis directions) of the emitted light from the light source 100 and/or due to the vertical and/or horizontal alignment (for example, in the Z and/or Y axis directions) between the light emitting end 110 of the light source 100 and the light receiving end 210 of the optical coupler 200. Accordingly, in some suitable embodiments, due to the profile, shape, dimensions, geometry and/or spacing of the waveguide core layers 230, 232, 234, 236 and 238, the optical coupler 200 acts to funnel, direct and/or otherwise urge the received light and/or its associated energy from the outer waveguide core layers 230, 232, 236 and 238 into and/or toward the central or middle waveguide core layer 234 for propagation to the output end 212 of the optical coupler 200. In some suitable embodiments, the relative spacings between, geometry, tapers and/or dimensions of the waveguide core layers 230, 232, 234, 236 and 238 can aid in promoting, encouraging, funneling, converging and/or otherwise directing or urging light and/or its associated energy to and/or toward the central or middle waveguide core layer 234, for example, while inhibiting or discouraging the coupling and/or transmission of light and/or its associated energy back outward toward the outermost waveguide core layers 230 and 238.

In some suitable embodiments, the second waveguide core layer 232 is spaced from the first waveguide core layer 230 by a distance or height H1 (for example, measured in a direction of the Z axis); the third waveguide core layer 234 is spaced from the first waveguide core layer 230 by a distance or height H2 (for example, measured in a direction of the Z axis); the fourth waveguide core layer 236 is spaced from the first waveguide core layer 230 by a distance or height H3 (for example, measured in a direction of the Z axis); and the fifth waveguide core layer 238 is spaced from the first waveguide core layer 230 by a distance or height H4 (for example, measured in a direction of the Z axis). In some suitable embodiments, the height H1 is in a range of between about 6% and about 13%, inclusive, of a value H, where H, for example, is in a range of between about 1 µm and about 4 µm, inclusive. In some suitable embodiments, the height H2 is in a range of between about 12% and about 26%, inclusive, of the value H. In some suitable embodiments, the height H3 is in a range of between about 18% and about 39%, inclusive, of the value H. In some suitable embodiments, the height H4 is in a range of between about 24% and about 52%, inclusive, of the value H. In some suitable embodiments, a difference Δh between any two consecutive heights (i.e., between H2 and H1, between H3 and H2 and between H4 and H3) may be in a range of between about 50 nm and about 1000 nm, inclusive.

In some suitable embodiments, the distinct waveguide paths in the outermost and central or middle waveguide core layers 230, 234 and 238 each have a horizontal width W1 (for example, measured in a direction of the Y axis), while the distinct waveguide paths in the intermediate waveguide core layers 232 and 236 each have a horizontal width W2 (for example, measured in a direction of the Y axis). In some suitable embodiments, the distinct waveguide paths in the intermediate waveguide core layers 232 and 236 are each separated from one another by a gap G1 (for example, measured in a direction of the Y axis), while the distinct waveguide paths in the outermost and central or middle waveguide core layers 230, 234 and 238 are each separated from one another by a gap G2 (for example, measured in a direction of the Y axis). Suitably, the gap G1 is in a range of between about 6% and about 15%, inclusive, of a value W, and the gap G1 is in a range of between about 6% and about 15%, inclusive, of the value W. In some suitable embodiments, the width W1 is in a range of between about 10.2% and about 16%, inclusive, of a value W, and the width W2 is in a range of between about 13% and about 20%, inclusive, of the value W. In some suitable embodiments, the value W is in a range of between about 6 µm and about 8 µm, inclusive.

Figure 10:
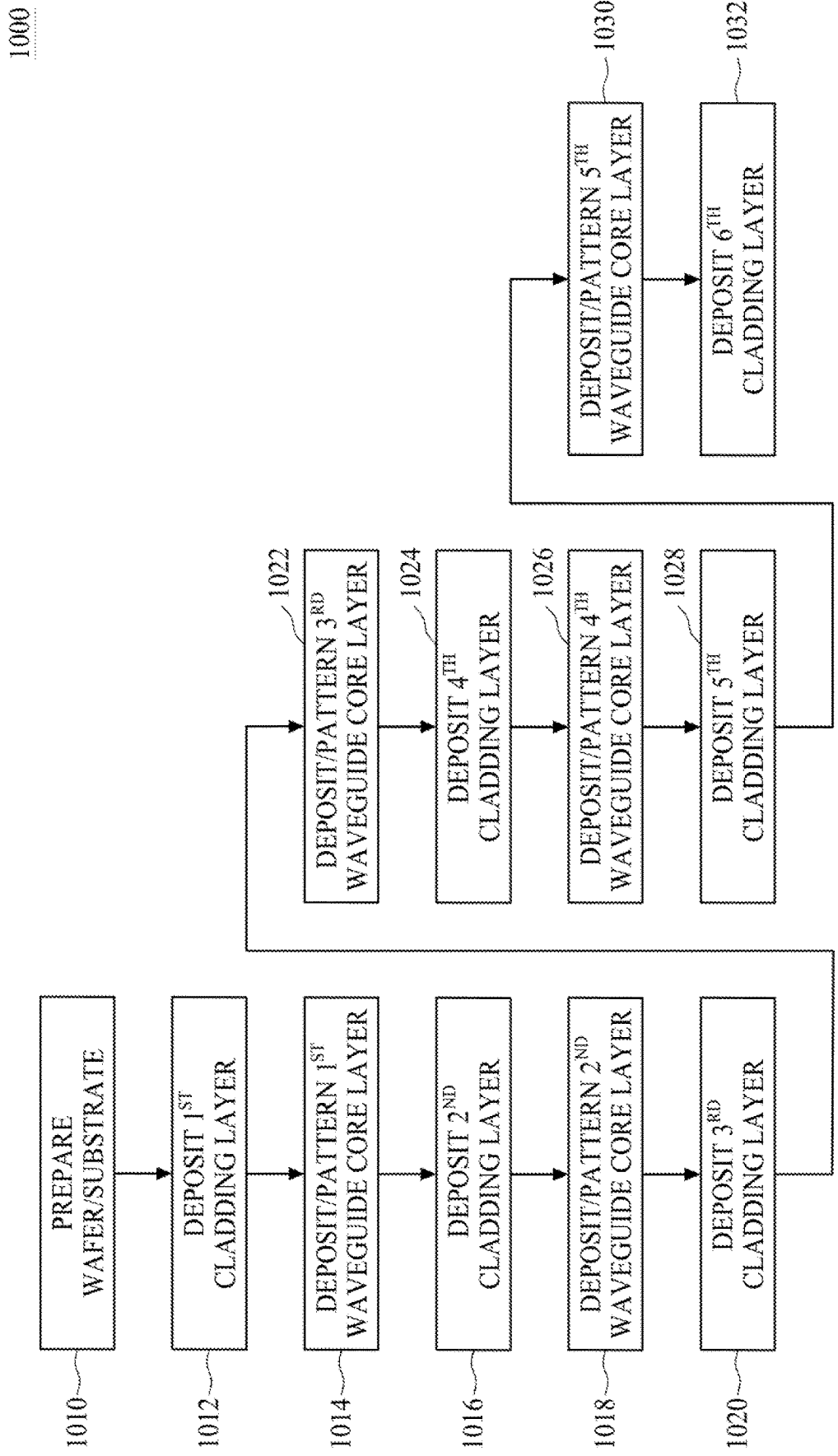
FIG. 10 is a flow chart showing a method of manufacturing a optical coupler in accordance with some embodiments disclosed herein.

With reference now to FIG. 10, the illustrated flowchart shows a semiconductor manufacturing process and/or method 1000 for manufacturing an optical coupler, for example, such as the optical coupler 200, in accordance with some embodiments disclosed herein.

At step 1010, the process or method 1000 may begin, in some suitable embodiments, with the preparation of a silicon wafer and/or other suitable substrate. For example, such preparation may include cleaning and/or inspecting of the wafer and/or substrate.

In some suitable embodiments, at step 1012, a first layer of cladding material, for example, such as silicon dioxide ($SiO_2$) and/or another suitable oxide or cladding material, may be deposited over the prepared wafer/substrate.

In some suitable embodiments, at step 1014, the first waveguide core layer 230 may be deposited and/or formed over the first layer of cladding material. For example, the first waveguide core layer 230 may be formed from and/or of a waveguide core material such as silicon nitride ($Si_3N_4$), silicon and/or another like material, suitably having an index of refraction $n_2$ which is greater than an index of refraction $n_1$ of the cladding material, at least for light having wavelengths at or near the operating wavelength of the light source 100, i.e., at or about the wavelength of the light emitted from the light source 100. In some suitable embodiments, step 1014 may include deposition of the waveguide core layer material and suitable patterning, for example, using photolithograph or the like, of the same to achieve the profile, shape, dimensions and/or geometry disclosed herein.

As shown, at step 1016, a second layer of cladding material, for example, such as silicon dioxide ($SiO_2$) and/or another suitable oxide or cladding material, may be deposited over the first waveguide core layer 230 and any underlying exposed portion of the first layer of cladding material. In some suitable embodiments, the second layer of cladding material may be the same material as the first layer of cladding material. Suitably, a thickness (for example, measured in a direction of the Z axis) of the deposited second layer of cladding material is controlled, regulated and/or adjusted such that a subsequently deposited and/or formed second waveguide core layer 232 is suitably spaced apart from the first waveguide core layer 230, for example, as disclosed herein.

In some suitable embodiments, at step 1018, the second waveguide core layer 232 may be deposited and/or formed over the second layer of cladding material. For example, the second waveguide core layer 232 may be formed from and/or of a waveguide core material such as silicon nitride ($Si_3N_4$), silicon and/or another like material, suitably having an index of refraction $n_2$ which is greater than an index of refraction $n_1$ of the cladding material, at least for light having wavelengths at or near the operating wavelength of the light source 100, i.e., at or about the wavelength of the light emitted from the light source 100. In some suitable embodiments, step 1018 may include deposition of the waveguide core layer material and suitable patterning, for example, using photolithograph or the like, of the same to achieve the profile, shape, dimensions and/or geometry disclosed herein.

As shown, at step 1020, a third layer of cladding material, for example, such as silicon dioxide ($SiO_2$) and/or another suitable oxide or cladding material, may be deposited over the second waveguide core layer 232 and any underlying exposed portion of the second layer of cladding material. In some suitable embodiments, the third layer of cladding material may be the same material as the second layer of cladding material. Suitably, a thickness (for example, measured in a direction of the Z axis) of the deposited third layer of cladding material is controlled, regulated and/or adjusted such that a subsequently deposited and/or formed third waveguide core layer 234 is suitably spaced apart from the first and/or second waveguide core layers 230 and 232, for example, as disclosed herein.

In some suitable embodiments, at step 1022, the third waveguide core layer 234 may be deposited and/or formed over the third layer of cladding material. For example, the third waveguide core layer 234 may be formed from and/or of a waveguide core material such as silicon nitride ($Si_3N_4$), silicon and/or another like material, suitably having an index of refraction $n_2$ which is greater than an index of refraction $n_1$ of the cladding material, at least for light having wavelengths at or near the operating wavelength of the light source 100, i.e., at or about the wavelength of the light emitted from the light source 100. In some suitable embodiments, step 1022 may include deposition of the waveguide core layer material and suitable patterning, for example, using photolithography or the like, of the same to achieve the profile, shape, dimensions and/or geometry disclosed herein.

As shown, at step 1024, a fourth layer of cladding material, for example, such as silicon dioxide ($SiO_2$) and/or another suitable oxide or cladding material, may be deposited over the third waveguide core layer 234 and any underlying exposed portion of the third layer of cladding material. In some suitable embodiments, the fourth layer of cladding material may be the same material as the third layer of cladding material. Suitably, a thickness (for example, measured in a direction of the Z axis) of the deposited fourth layer of cladding material is controlled, regulated and/or adjusted such that a subsequently deposited and/or formed fourth waveguide core layer 236 is suitably spaced apart from the first and/or third waveguide core layers 230 and 234, for example, as disclosed herein.

In some suitable embodiments, at step 1026, the fourth waveguide core layer 236 may be deposited and/or formed over the fourth layer of cladding material. For example, the fourth waveguide core layer 236 may be formed from and/or of a waveguide core material such as silicon nitride ($Si_3N_4$), silicon and/or another like material, suitably having an index of refraction $n_2$ which is greater than an index of refraction $n_1$ of the cladding material, at least for light having wavelengths at or near the operating wavelength of the light source 100, i.e., at or about the wavelength of the light emitted from the light source 100. In some suitable embodiments, step 1026 may include deposition of the waveguide core layer material and suitable patterning, for example, using photolithography or the like, of the same to achieve the profile, shape, dimensions and/or geometry disclosed herein.

As shown, at step 1028, a fifth layer of cladding material, for example, such as silicon dioxide ($SiO_2$) and/or another suitable oxide or cladding material, may be deposited over the fourth waveguide core layer 236 and any underlying exposed portion of the fourth layer of cladding material. In some suitable embodiments, the fifth layer of cladding material may be the same material as the fourth layer of cladding material. Suitably, a thickness (for example, measured in a direction of the Z axis) of the deposited fifth layer of cladding material is controlled, regulated and/or adjusted such that a subsequently deposited and/or formed fifth waveguide core layer 238 is suitably spaced apart from the first and/or fourth waveguide core layers 230 and 236, for example, as disclosed herein.

In some suitable embodiments, at step 1030, the fifth waveguide core layer 238 may be deposited and/or formed over the fifth layer of cladding material. For example, the fifth waveguide core layer 238 may be formed from and/or of a waveguide core material such as silicon nitride ($Si_3N_4$), silicon and/or another like material, suitably having an index of refraction $n_2$ which is greater than an index of refraction $n_1$ of the cladding material, at least for light having wavelengths at or near the operating wavelength of the light source 100, i.e., at or about the wavelength of the light emitted from the light source 100. In some suitable embodiments, step 1030 may include deposition of the waveguide core layer material and suitable patterning, for example, using photolithography or the like, of the same to achieve the profile, shape, dimensions and/or geometry disclosed herein.

As shown, at step 1032, a sixth layer of cladding material, for example, such as silicon dioxide ($SiO_2$) and/or another suitable oxide or cladding material, may be deposited over the fifth waveguide core layer 238 and any underlying exposed portion of the fifth layer of cladding material. In some suitable embodiments, the sixth layer of cladding material may be the same material as the fifth layer of cladding material. Suitably, a thickness (for example, measured in a direction of the Z axis) of the deposited sixth layer of cladding material is controlled, regulated and/or adjusted such that the fifth waveguide core layer 238 is adequately covered and/or encased in the cladding material, for example, as disclosed herein.

In the following, some further illustrative embodiments are described.

In some embodiments, an optical coupler includes: a plurality of waveguide core layers formed from a waveguide core material having a first index of refraction, the waveguide core layers being (i) stacked vertically one over another, (ii) spaced apart vertically one from another and (iii) extending from a light receiving end of the optical coupler longitudinally through the optical coupler to a light output end of the optical coupler, wherein each of the plurality of waveguide core layers includes a plurality of distinct waveguide paths extending from the light receiving end of the optical coupler along a length of the optical coupler; and a cladding formed from a cladding material having a second index of refraction, the second index of refraction being less than the first index of refraction, the cladding material surrounding each of the plurality of waveguide core layers. Suitably, light propagating within outer ones of the plurality of waveguide core layers is directed toward an interior one of the plurality of waveguide core layers via evanescent coupling between adjacent ones of the plurality of waveguide core layers.

In yet further embodiments, the plurality of waveguide core layers includes: a central waveguide core layer; a pair of outermost waveguide core layers arranged on opposite sides of the central waveguide core layer; and a pair of intermediate waveguide core layers arranged on opposite sides of the central waveguide core layer and interposed between the outermost waveguide core layers and the central waveguide core layer.

In still further embodiments, the pair of outermost waveguide core layers and the central waveguide core layer each have an odd number of distinct waveguide paths, while the pair of intermediate waveguide core layers each have an even number of distinct waveguide paths.

In some embodiments, each of the plurality of waveguide core layers has a tapered region proximate the light output end of the optical coupler, the tapered region narrowing in a horizontal direction from a first width proximate the distinct waveguide paths to a second width at the light output end of the optical coupler.

In some embodiments, the first width in the pair of outermost waveguide core layers is greater than the first width in the pair of intermediate waveguide core layers.

In some suitable embodiments, the second width in the pair of outermost waveguide core layers is less than the second width in the pair of intermediate waveguide core layers.

In some additional embodiments, the plurality of waveguide core layers includes a first waveguide core layer, a second waveguide core layer arranged over the first waveguide core layer, a third waveguide core layer arranged over the second waveguide core layer, a fourth waveguide core layer arranged over the third waveguide core layer and a fifth waveguide core layer arranged over the fourth waveguide core layer; and the second wave guide core layer is spaced apart from the first waveguide core layer by between 6% and 13%, inclusive, of a distance d, the third waveguide core layer is spaced apart from the first waveguide core layer by between 12% and 26%, inclusive, of the distance d, the fourth waveguide core layer is spaced apart from the first waveguide core layer by between 18% and 39%, inclusive, of the distance d, the fifth waveguide core layer is spaced apart from the first waveguide core layer by between 24% and 52%, inclusive, of the distance d, and the distance d is between 1 µm and 4 µm, inclusive.

In some embodiments, the waveguide core material is silicon nitride and the cladding material is silicon dioxide.

In some suitable embodiments, a photonic integrated circuit includes: a light source having a light emitting end from which light is emitted; and an optical coupler having a light receiving end facing the light emitting end of the light source to receive light emitted therefrom. Suitably, the optical coupler has a light output end opposite the light receiving end and includes: a plurality of waveguide core layers formed from a waveguide core material having a first index of refraction, the waveguide core layers being (i) stacked one over another, (ii) spaced apart one from another and (iii) extending from the light receiving end of the optical coupler longitudinally through the optical coupler to the light output end of the optical coupler, wherein each of the plurality of waveguide core layers includes a plurality of distinct waveguide paths extending from the light receiving end of the optical coupler along a length of the optical coupler; and a cladding formed from a cladding material having a second index of refraction, the second index of refraction being less than the first index of refraction, the cladding material surrounding each of the plurality of waveguide core layers. Suitably, the light emitted from the light source which enters outer ones of the plurality of waveguide core layers is transmitted toward an interior one of the plurality of waveguide core layers via evanescent coupling between adjacent ones of the plurality of waveguide core layers.

In further embodiments, the plurality of waveguide core layers includes: a central waveguide core layer; a pair of outermost waveguide core layers arranged on opposite sides of the central waveguide core layer; and a pair of intermediate waveguide core layers arranged on opposite sides of the central waveguide core layer and interposed between the outermost waveguide core layers and the central waveguide core layer.

In some embodiments, the pair of outermost waveguide core layers and the central waveguide core layer each have an odd number of distinct waveguide paths, while the pair of intermediate waveguide core layers each have an even number of distinct waveguide paths.

In yet further embodiments, each of the plurality of waveguide core layers has a tapered region proximate the light output end of the optical coupler, the tapered region narrowing in a horizontal direction from a first width proximate the distinct waveguide paths to a second width at the light output end of the optical coupler, the first width in the pair of outermost waveguide core layers is greater than the first width in the pair of intermediate waveguide core layers;

and the second width in the pair of outermost waveguide core layers is less than the second width in the pair of intermediate waveguide core layers.

In some embodiments, each of the distinct waveguide paths in the pair of intermediate waveguide core layers has a first horizontal width, each of the distinct waveguide paths in the outmost pair and the central waveguide core layers has a second horizontal width, and the first horizontal width is greater than the second horizontal width.

In some embodiments, the plurality of waveguide core layers includes a first waveguide core layer, a second waveguide core layer arranged over the first waveguide core layer, a third waveguide core layer arranged over the second waveguide core layer, a fourth waveguide core layer arranged over the third waveguide core layer and a fifth waveguide core layer arranged over the fourth waveguide core layer; and the second wave guide core layer is spaced apart from the first waveguide core layer by between 6% and 13%, inclusive, of a distance d, the third waveguide core layer is spaced apart from the first waveguide core layer by between 12% and 26%, inclusive, of the distance d, the fourth waveguide core layer is spaced apart from the first waveguide core layer by between 18% and 39%, inclusive, of the distance d, and the fifth waveguide core layer is spaced apart from the first waveguide core layer by between 24% and 52%, inclusive, of the distance d.

In some embodiments, the distance d is between 1 μm and 4 μm, inclusive.

In yet further embodiments, the light source is one of a laser diode, a semiconductor optical amplifier and a fiber optic and the light emitted from the light emitting end of the light source has a wavelength in a range of between 1260 nm and 1360 nm, inclusive.

In still further embodiments, the light emitting end of the light source and the light receiving end of the optical coupler are separated by a gap, the gap being filled with a filler material having an index of refraction in a range of between 1.1 and 3.9 inclusive, the filler material being one of a high dielectric constant material and sol-gel.

In some suitable embodiments, the waveguide core material is silicon nitride and the cladding material is silicon dioxide.

In some suitable embodiments, a method of fabricating an optical coupler, having a first light receiving end and a second light output end opposite the first light receiving end, includes: forming a cladding from a cladding material having a first index of refraction; and forming a plurality of waveguide core layers contained within the cladding from a core material having a second index of refraction greater than the first index of refraction. The waveguide core layers are (i) stacked one over another, (ii) spaced apart one from another and (iii) extending from the first light receiving end of the optical coupler longitudinally through the cladding to the second light output end of the optical coupler, wherein each of the plurality of waveguide core layers includes a plurality of distinct waveguide paths extending from the first light receiving end of the optical coupler along a length of the optical coupler. Suitably, the plurality of waveguide core layers are arranged such that light energy associated with light that enters outer ones of the plurality of waveguide core layers at the first light receiving end of the optical coupler is conveyed toward an interior one of the plurality of waveguide core layers via evanescent coupling between adjacent ones of the plurality of waveguide core layers.

In yet additional embodiments, the core material is silicon nitride; and the cladding material is silicon dioxide.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An optical coupler including:
   a plurality of waveguide core layers formed from a waveguide core material having a first index of refraction, said waveguide core layers being (i) stacked vertically one over another, (ii) spaced apart vertically one from another and (iii) extending from a light receiving end of the optical coupler longitudinally through the optical coupler to a light output end of the optical coupler, wherein each of the plurality of waveguide core layers includes a tapered region joined to a plurality of distinct waveguide paths, wherein each distinct waveguide path extends from the light receiving end of the optical coupler along a length of the optical coupler to the tapered region, and wherein the tapered region is proximate the light output end and narrows in a horizontal direction from a first width proximate the distinct waveguide paths to a second width at the light output end; and
   a cladding formed from a cladding material having a second index of refraction, said second index of refraction being less than the first index of refraction, said cladding material surrounding each of the plurality of waveguide core layers;
   wherein light propagating within outer ones of the plurality of waveguide core layers is directed toward an interior one of the plurality of waveguide core layers via evanescent coupling between adjacent ones of the plurality of waveguide core layers.

2. The optical coupler of claim 1, wherein the plurality of waveguide core layers comprises:
   a central waveguide core layer;
   a pair of outermost waveguide core layers arranged on opposite sides of the central waveguide core layer; and
   a pair of intermediate waveguide core layers arranged on opposite sides of the central waveguide core layer and interposed between the outermost waveguide core layers and the central waveguide core layer.

3. The optical coupler of claim 2, wherein the pair of outermost waveguide core layers and the central waveguide core layer each have an odd number of distinct waveguide paths, while the pair of intermediate waveguide core layers each have an even number of distinct waveguide paths.

4. The optical coupler of claim 2, wherein of each of the distinct waveguide paths in the pair of intermediate waveguide core layers has a first horizontal width, each of the distinct waveguide paths in the outmost pair and the central waveguide core layers has a second horizontal width, and the first horizontal width is greater than the second horizonal width.

5. The optical coupler of claim 1, wherein:
   the first width in the pair of outermost waveguide core layers is greater than the first width in the pair of intermediate waveguide core layers.

6. The optical coupler of claim 1, wherein:
the second width in the pair of outermost waveguide core layers is less than the second width in the pair of intermediate waveguide core layers.

7. The optical coupler of claim 1, wherein:
the plurality of waveguide core layers includes a first waveguide core layer, a second waveguide core layer arranged over the first waveguide core layer, a third waveguide core layer arranged over the second waveguide core layer, a fourth waveguide core layer arranged over the third waveguide core layer and a fifth waveguide core layer arranged over the fourth waveguide core layer; and
the second wave guide core layer is spaced apart from the first waveguide core layer by between 6% and 13%, inclusive, of a distance d, the third waveguide core layer is spaced apart from the first waveguide core layer by between 12% and 26%, inclusive, of the distance d, the fourth waveguide core layer is spaced apart from the first waveguide core layer by between 18% and 39%, inclusive, of the distance d, the fifth waveguide core layer is spaced apart from the first waveguide core layer by between 24% and 52%, inclusive, of the distance d, and the distance d is between 1 μm and 4 μm, inclusive.

8. The optical coupler of claim 1, wherein the waveguide core material is silicon nitride and the cladding material is silicon dioxide.

9. A photonic integrated circuit including:
a light source having a light emitting end from which light is emitted; and
an optical coupler having a light receiving end facing the light emitting end of the light source to receive light emitted therefrom, said optical coupler having a light output end opposite the light receiving end and including:
  a plurality of waveguide core layers formed from a waveguide core material having a first index of refraction, said waveguide core layers being (i) stacked one over another, (ii) spaced apart one from another and (iii) extending from the light receiving end of the optical coupler longitudinally through the optical coupler to the light output end of the optical coupler, wherein each of the plurality of waveguide core layers includes a tapered region joined to a plurality of distinct waveguide paths, wherein each distinct waveguide path extends from the light receiving end of the optical coupler along a length of the optical coupler to the tapered region, and wherein the tapered region is proximate the light output end and narrows in a horizontal direction from a first width proximate the distinct waveguide paths to a second width at the light output end; and
  a cladding formed from a cladding material having a second index of refraction, said second index of refraction being less than the first index of refraction, said cladding material surrounding each of the plurality of waveguide core layers;
wherein light emitted from the light source which enters outer ones of the plurality of waveguide core layers is transmitted toward an interior one of the plurality of waveguide core layers via evanescent coupling between adjacent ones of the plurality of waveguide core layers.

10. The photonic integrated circuit of claim 9, wherein the plurality of waveguide core layers comprises:
a central waveguide core layer;
a pair of outermost waveguide core layers arranged on opposite sides of the central waveguide core layer; and
a pair of intermediate waveguide core layers arranged on opposite sides of the central waveguide core layer and interposed between the outermost waveguide core layers and the central waveguide core layer.

11. The photonic integrated circuit of claim 10, wherein the pair of outermost waveguide core layers and the central waveguide core layer each have an odd number of distinct waveguide paths, while the pair of intermediate waveguide core layers each have an even number of distinct waveguide paths.

12. The photonic integrated circuit of claim 10, wherein:
the first width in the pair of outermost waveguide core layers is greater than the first width in the pair of intermediate waveguide core layers; and
the second width in the pair of outermost waveguide core layers is less than the second width in the pair of intermediate waveguide core layers.

13. The photonic integrated circuit of claim 10, wherein of each of the distinct waveguide paths in the pair of intermediate waveguide core layers has a first horizontal width, each of the distinct waveguide paths in the outmost pair and the central waveguide core layers has a second horizontal width, and the first horizontal width is greater than the second horizonal width.

14. The photonic integrated circuit of claim 9, wherein:
the plurality of waveguide core layers includes a first waveguide core layer, a second waveguide core layer arranged over the first waveguide core layer, a third waveguide core layer arranged over the second waveguide core layer, a fourth waveguide core layer arranged over the third waveguide core layer and a fifth waveguide core layer arranged over the fourth waveguide core layer; and
the second wave guide core layer is spaced apart from the first waveguide core layer by between 6% and 13%, inclusive, of a distance d, the third waveguide core layer is spaced apart from the first waveguide core layer by between 12% and 26%, inclusive, of the distance d, the fourth waveguide core layer is spaced apart from the first waveguide core layer by between 18% and 39%, inclusive, of the distance d, and the fifth waveguide core layer is spaced apart from the first waveguide core layer by between 24% and 52%, inclusive, of the distance d.

15. The photonic integrated circuit of claim 14, wherein the distance d is between 1 μm and 4 μm, inclusive.

16. The photonic integrated circuit of claim 9, wherein the light source is one of a laser diode, a semiconductor optical amplifier and a fiber optic and the light emitted from the light emitting end of the light source has a wavelength in a range of between 1260 nm and 1360 nm, inclusive.

17. The photonic integrated circuit of claim 9, wherein the light emitting end of the light source and the light receiving end of the optical coupler are separated by a gap, said gap being filled with a filler material having an index of refraction in a range of between 1.1 and 3.9 inclusive, said filler material being one of a high dielectric constant material and sol-gel.

18. The photonic integrated circuit of claim 9, wherein the waveguide core material is silicon nitride and the cladding material is silicon dioxide.

19. A method of fabricating an optical coupler having a first light receiving end and a second light output end opposite the first light receiving end, said method comprising:

forming a cladding from a cladding material having a first index of refraction; and forming a plurality of waveguide core layers contained within the cladding from a core material having a second index of refraction greater than the first index of refraction, said waveguide core layers being (i) stacked one over another, (ii) spaced apart one from another and (iii) extending from the first light receiving end of the optical coupler longitudinally through the cladding to the second light output end of the optical coupler, wherein each of the plurality of waveguide core layers includes a tapered region joined to a plurality of distinct waveguide paths, wherein each distinct waveguide path extends from the first light receiving end of the optical coupler along a length of the optical coupler to the tapered region, and wherein the tapered region is proximate the light output end and narrows in a horizontal direction from a first width proximate the distinct waveguide paths to a second width at the light output end;

wherein said plurality of waveguide core layers are arranged such that light energy associated with light that enters outer ones of the plurality of waveguide core layers at the first light receiving end of the optical coupler is conveyed toward an interior one of the plurality of waveguide core layers via evanescent coupling between adjacent ones of the plurality of waveguide core layers.

20. The method of claim 19, wherein:
the core material is silicon nitride; and
the cladding material is silicon dioxide.

* * * * *